United States Patent
Vasseur

(10) Patent No.: US 7,839,767 B2
(45) Date of Patent: Nov. 23, 2010

(54) PATH REROUTE IN A COMPUTER NETWORK

(75) Inventor: Jean-Philippe Marcel Vasseur, Dunstable, MA (US)

(73) Assignee: Cisco Technology, Inc., San Jose, CA (US)

( * ) Notice: Subject to any disclaimer, the term of this patent is extended or adjusted under 35 U.S.C. 154(b) by 165 days.

(21) Appl. No.: 12/044,196

(22) Filed: Mar. 7, 2008

(65) Prior Publication Data

US 2009/0225650 A1    Sep. 10, 2009

(51) Int. Cl.
*G01R 31/08* (2006.01)

(52) U.S. Cl. .......................... 370/218; 370/221; 370/217

(58) Field of Classification Search .................. None
See application file for complete search history.

(56) References Cited

U.S. PATENT DOCUMENTS 7,330,435 B2 * 2/2008 Guerin et al. ............... 370/401

2006/0153067 A1 * 7/2006 Vasseur et al. .............. 370/217
2007/0036072 A1 * 2/2007 Raj et al. .................... 370/225
2007/0174483 A1 * 7/2007 Raj et al. .................... 709/238

\* cited by examiner

*Primary Examiner*—Chi H Pham
*Assistant Examiner*—Kouroush Mohebbi
(74) *Attorney, Agent, or Firm*—Schwegman, Lundberg & Woessner, P.A.

(57) ABSTRACT

In an example embodiment, a method is provided that receives a first label from an area border routing device. Here, the first label is associated with a first routing device, which is an immediate downstream neighbor of the area border routing device. The first label is then associated with a second label that is associated with a second routing device. In an example, the first label is received from the area border routing device along a path. Data that includes the second label subsequently is received and the second label in the data is replaced with the first label upon a failure of the area border router. The data then is encapsulated in an alternate path to the first routing device.

14 Claims, 11 Drawing Sheets

PATH REROUTE IN A COMPUTER NETWORK

FIELD

The present disclosure relates generally to computer networks. In an example embodiment, the disclosure relates to path reroute in a computer network.

BACKGROUND

Multiprotocol Label Switching (MPLS) Traffic Engineering Fast Reroute (FRR) has been a driving mechanism in the deployment of MPLS Traffic Engineering. Although many of the deployments started with an interest for link protection, most of the recent FRR deployments use FRR for link and node protection. One of the main limitations with FRR node protection is that it requires a full set of mesh of Traffic Engineering label switched paths between a set of nodes (e.g. routers). Such a full mesh may not be applicable to large scale environments that may involve hundreds of nodes in the mesh. Furthermore, FRR node protection does not protect traffic from a failure of area border routers when MPLS Traffic Engineering is deployed on a per-area basis where the Traffic Engineering label switched paths terminate and originate on the area border routers, which are critical points in the computer network, that are prone to failures.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

In the following description, for purposes of explanation, numerous specific details are set forth in order to provide a thorough understanding of an example embodiment of the present disclosure. It will be evident, however, to one skilled in the art that the present disclosure may be practiced without these specific details.

Overview

A method is provided that receives a first label from an area border routing device. Here, the first label is associated with a first routing device, which is an immediate downstream neighbor of the area border routing device. The first label is then associated with a second label that is associated with a second routing device. In an example, the first label is received from the area border routing device along a path. Data that includes the second label subsequently is received and the second label in the data is replaced with the first label upon a failure of the area border router. The data then is encapsulated in an alternate path to the first routing device.

EXAMPLE EMBODIMENTS

Figure 1:
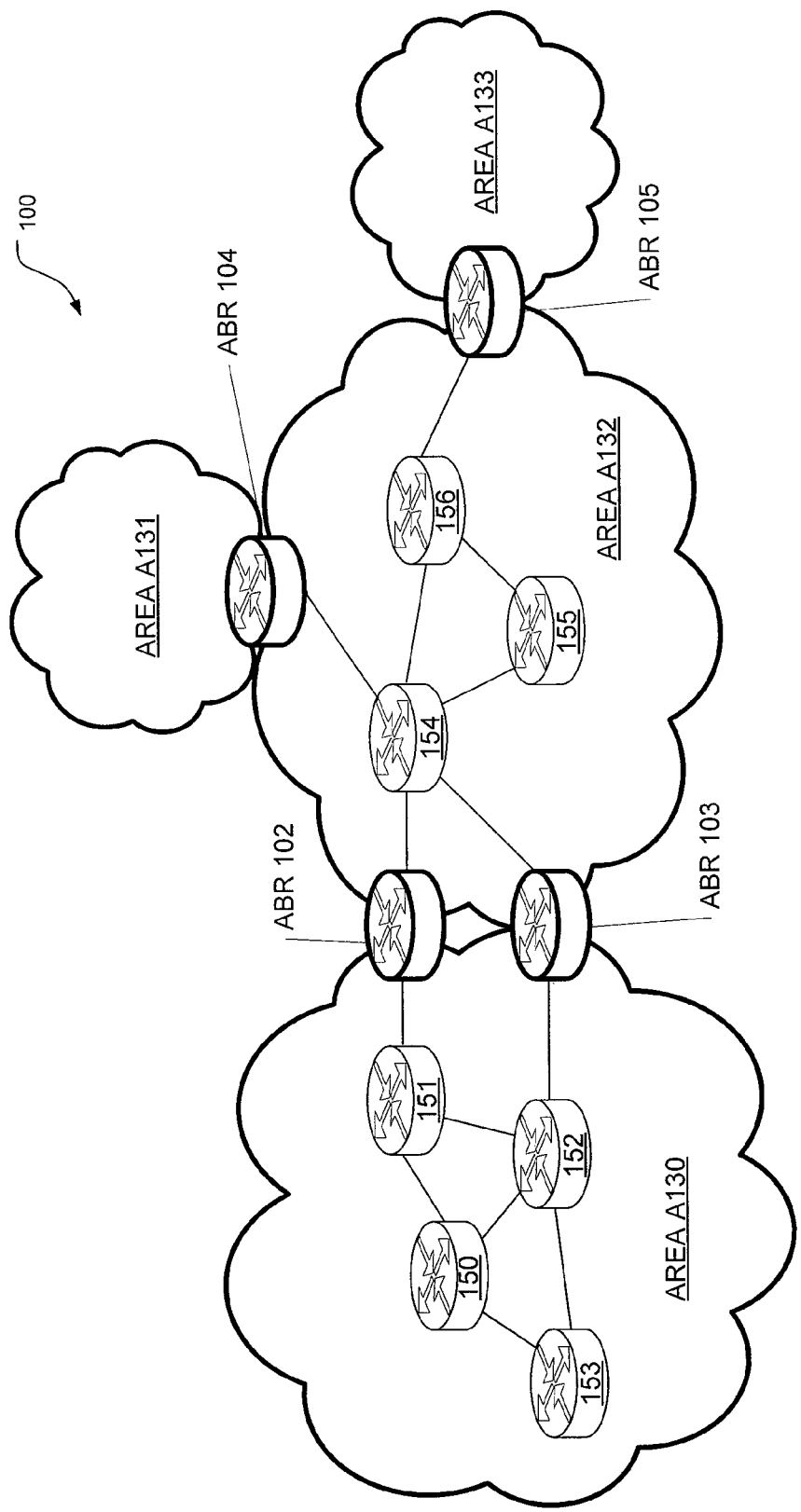
FIG. 1 is a simplified diagram of an example computer network.

FIG. 1 is a simplified diagram of an example computer network. Computer network 100 may include multiple intra-domain areas A130-A133 interconnected by area border routing devices ABR102-ABR105. Generally, computer network 100 is a geographically distributed collection of nodes interconnected by communication links and segments for transporting data between end nodes, such as personal computers and workstations. Computer network 100 may be further interconnected by one or more intermediate network nodes, such as routing devices ABR102-ABR105 and 150-156. Examples of computer networks, such as computer network 100, include local area networks and wide area networks. A local area network connects the nodes over dedicated private communications links located in the same general physical location, such as a building or a campus. A wide area network, on the other hand, connects geographically dispersed nodes over long-distance communications links, such as common carrier telephone lines, opticallightpaths, synchronous optical networks (SONET), or synchronous digital hierarchy (SDH) links. The Internet is an example of a wide area network that connects disparate networks throughout the world, providing global communication between nodes on various networks. The nodes communicate over computer network 100 by exchanging discrete frames or packets of data according to predefined protocols, such as Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, interior gateway protocol (IGP), and other protocols.

It should be appreciated that groups of computer networks may be maintained as routing domains. A domain is a collection of nodes (e.g., routers, switches, and other nodes) under the control of one or more entities that present a common routing policy. To improve routing scalability, a service provider (e.g., an Internet service provider) may further divide a domain into multiple areas (or levels) A130-A133. Intra-domain areas A130-A133 are groups of contiguous networks and attached hosts. To increase the number of nodes capable of exchanging data, area border routing devices ABR102-ABR105 may be used to interconnect nodes of various areas A130-133. Generally, routing devices that interconnect different areas A130-A133 are area border routing devices ABR102-ABR105. Area border routing devices ABR102-

ABR 105 include multiple interfaces that can participate in multiple areas, such as A130 and A133. Furthermore, area border routing devices ABR102-ABR105 maintain separate topological databases for each area A130, A131, A132 or A133. A label switch router (LSR) is a routing device that supports Multiprotocol Label Switching (MPLS) and is an example of an area border routing device, such as ABR102-ABR105. A label switch router is also a type of a router located in the middle of a Multiprotocol Label Switching (MPLS) network, described in more detail below, which is responsible for switching the labels used to route packets. A label is a short, fixed length, locally significant identifier used to identify a forwarding equivalence class.

Nodes within areas A130-A133 may be present that may interconnect to area border routers ABR102-ABR105 of each of the areas. For example, as shown in FIG. 1, routing device 153 (a node) in area A130 may be interconnected by one or more paths, each of which may comprise one or more particular links/nodes not shown for ease of discussion to area border routing devices ABR102 and ABR103. It should be noted that a number of nodes, routers, links, etc. may be used in computer network 100, and that the computer network of FIG. 1 shown herein is for simplicity. Further, computer network 100 is described in relation to multiple areas A130-A133, and the computer network may apply to a variety of other network configurations, such as intra-domain, inter-AS, intra-area, intra-level, and other network configurations.

Figure 2:
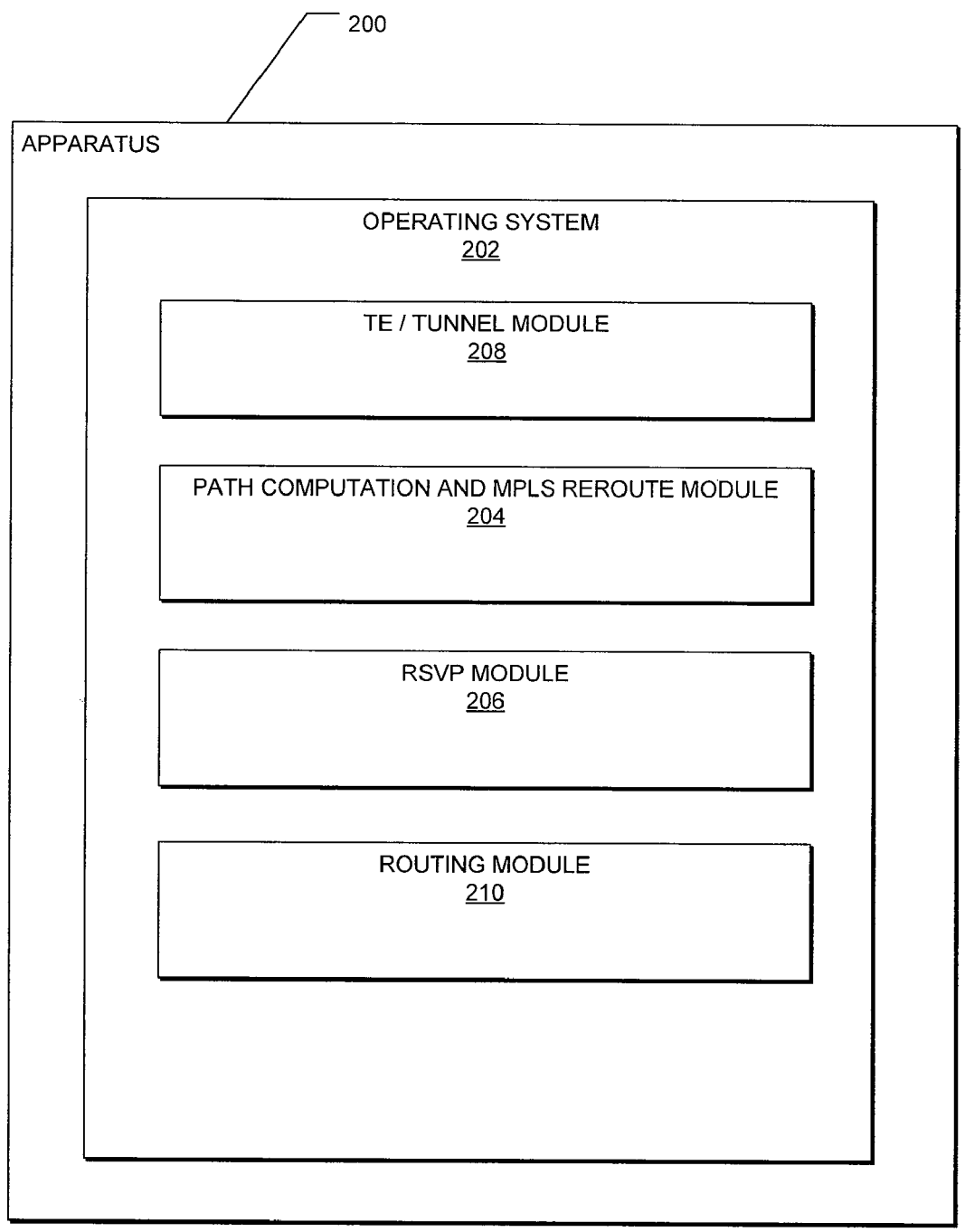
FIG. 2 is a simplified block diagram of modules included in an apparatus, in accordance with an example embodiment.

FIG. 2 is a simplified block diagram of modules included in an apparatus, in accordance with an example embodiment. Apparatus 200 includes operating system 202 (e.g., an Internetworking Operating System) that manages the software processes and/or services executing on the apparatus. As shown in FIG. 2, these software processes and/or services may include path computation and MPLS reroute module 204, traffic engineering (TE)/tunnel module 208, Resource Reservation Protocol (RSVP) module 206, and routing module 210. It should be appreciated that apparatus 200 may be deployed in the form of a variety of network devices that receives data for communication to other network devices, such as routers, switches or the like. For example, apparatus 200 may form a part of one of the routing devices depicted in FIG. 1, such as routing devices ABR102-ABR105 and 150-156. In various example embodiments, apparatus 200 may be used to implement computer programs, logic, applications, methods, processes, or other software to reroute paths, as described in more detail below.

Referring to FIG. 2, routing module 210 performs functions provided by one or more routing protocols. Examples of routing protocols include IGP, Border Gateway Protocol (BGP), and other routing protocols. These functions may include the management of routing and the forwarding of information databases containing, for example, data used to make routing and forwarding decisions. Routing module 210 may also perform functions related to virtual routing protocols, such as maintaining virtual routing and forwarding instances.

Traffic Engineering (TE)/tunnel module 208 implements traffic engineering and tunnel functions. It should be appreciated that Multi-Protocol Label Switching Traffic Engineering (MPLS TE) has been developed to meet data networking requirements such as guaranteed available bandwidth and fast restoration. MPLS TE uses label switching techniques to build end-to-end tunnels based on a series of constraints through an IP/MPLS network of label switch routers. These tunnels may be a type of label switched path (LSP) and thus are generally referred to as MPLS TE-LSPs. Accordingly, as used herein, it should be noted that a tunnel may be referred to as a "path," and such terms may be used interchangeably. Generally, a path is a logical structure that encapsulates a packet of one protocol inside a data field of another or the same protocol packet with a new header. In this manner, the data encapsulated within a TE-LSP may be transmitted following a route that differs from the route that would be determined by the Internet Protocol (IP) routing protocol. In other examples, the encapsulated data may be transmitted through networks that it would otherwise not be capable of traversing. A path establishes a transparent virtual network link between two network nodes that is generally unaffected by physical network links or devices (e.g., the physical network links or devices merely forward the encapsulated packet based on the new header). Examples of paths may include a label switched path, an MPLS TE-LSP, and other paths.

The paths may be signaled through the use of Resource Reservation Protocol (RSVP) protocol (with Traffic Engineering extensions), such as RSVP TE signaling messages. RSVP module 206 implements RSVP and processes RSVP messages. In traffic engineering applications, RSVP signaling is used to establish a path and to convey various path attributes to routing devices, such as area border routing devices, along the path. It should be noted that the use of RSVP serves merely as an example, and that other communication protocols may be used in accordance with the example embodiments described herein.

Path computation and MPLS reroute module 204 is configured to compute a path from one routing device to another routing device, to signal along the path, and/or to modify forwarding tables at intermediate routing devices along the path. Examples of path computation module and MPLS reroute module 204 include Path Computation Element (PCE) and Path Computation Client (PCC). As explained in more detail below, path computation and MPLS reroute module 204 may also be configured to reroute traffic (or flow of data) around an area border routing device in the event that the area border routing device fails.

It should be appreciated that in other example embodiments, apparatus 200 may include fewer or more modules apart from those shown in FIG. 2. For example, path computation and MPLS reroute module 204 may be separated into a path computation module that computes paths and another MPLS reroute module that reroutes traffic.

Figure 3:
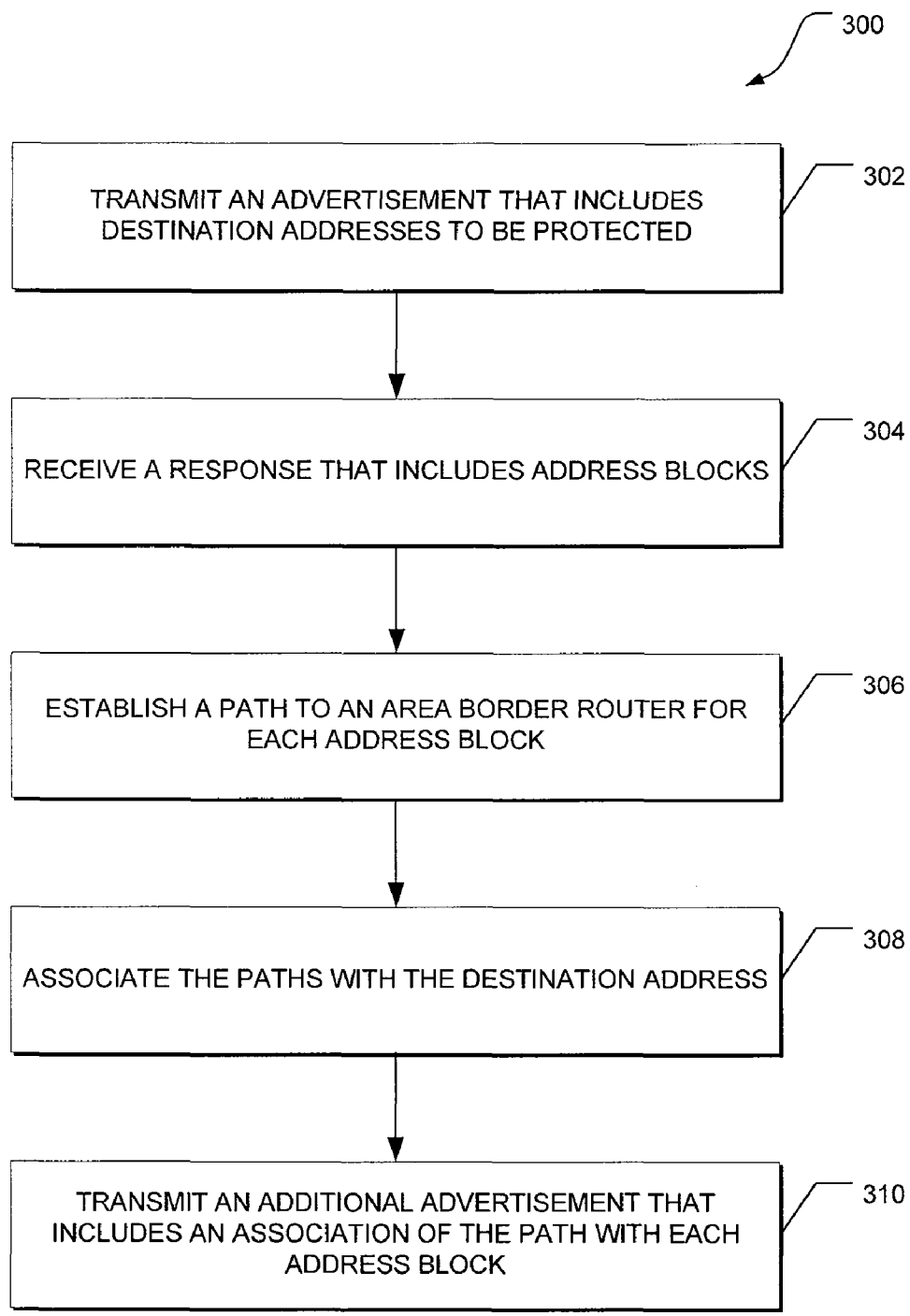
FIG. 3 is a flow diagram of a general overview of a method, in accordance with an example embodiment, for establishing paths based on responses from an area border router.

FIG. 3 is a flow diagram of a general overview of a method, in accordance with an example embodiment, for establishing paths based on responses from an area border router. In an example embodiment, method 300 may be implemented by path computation and MPLS reroute module 204 of FIG. 2, employed in an apparatus, such as routing device 153 of FIG. 1. As shown in FIG. 3, a routing device within an area transmits an advertisement to one or more area border routing devices at 302. The advertisement includes one or more destination addresses to be protected if area border routing device fails. An example of a destination address is an IP address. Here, the flow of data to and from the destination address is to be protected from failure of the area border routing device by rerouting the flow of data around the failed area border routing device. In an example, the destination addresses may be advertised with the use of a type/length/value (TLV) carried within an LSP-ATTRIBUTE of an RSVP path message.

The routing device then receives a response from the area border routing device at 304 in response to transmitting the advertisement. This response may include one or more address blocks. A single address block is a group or set of one or more addresses that identify a single path used by the area border routing device, which is explained in more detail below. An address block may, for example, include a group of IP prefixes. In another example, a single address block may include a single IP prefix. The routing device, at 306, then establishes a path to the area border routing device for each address block received. Here, each address block is associated with one path. For example, if three address blocks are received, then the routing device establishes three paths to the area border routing device, where each path corresponds to one address block. In an example embodiment, the establishment of a path may include assigning an existing path that is already destined to the area border routing device. For example, if a single address block is received, then the routing device may assign an existing path already destined to the area border routing device. In another example embodiment, the establishment of the path may include establishing a new path to the area border routing device. For example, if two address blocks are received, then the routing device may assign an existing path to the area border routing device. Additionally, the routing device may establish a new path to the area border routing device, thereby having a total of two paths to the area border routing device.

In an example embodiment, the routing device may additionally associate the established paths with the destination addresses at 308. For example, the routing device may associate a new path with a particular destination address. In another example, the routing device may associate an existing path with another destination address.

Furthermore, in an example embodiment, at 310, the routing device may transmit an additional advertisement to the area border routing device that includes an association of the established paths with each of the address blocks. For example, the routing device may have established a path for a particular address block. The additional advertisement would include that association between the path and the particular address block. It should be appreciated that the association may also be advertised with the use of a TLV carried within an LSP-ATTRIBUTE of a path message.

Figure 4:
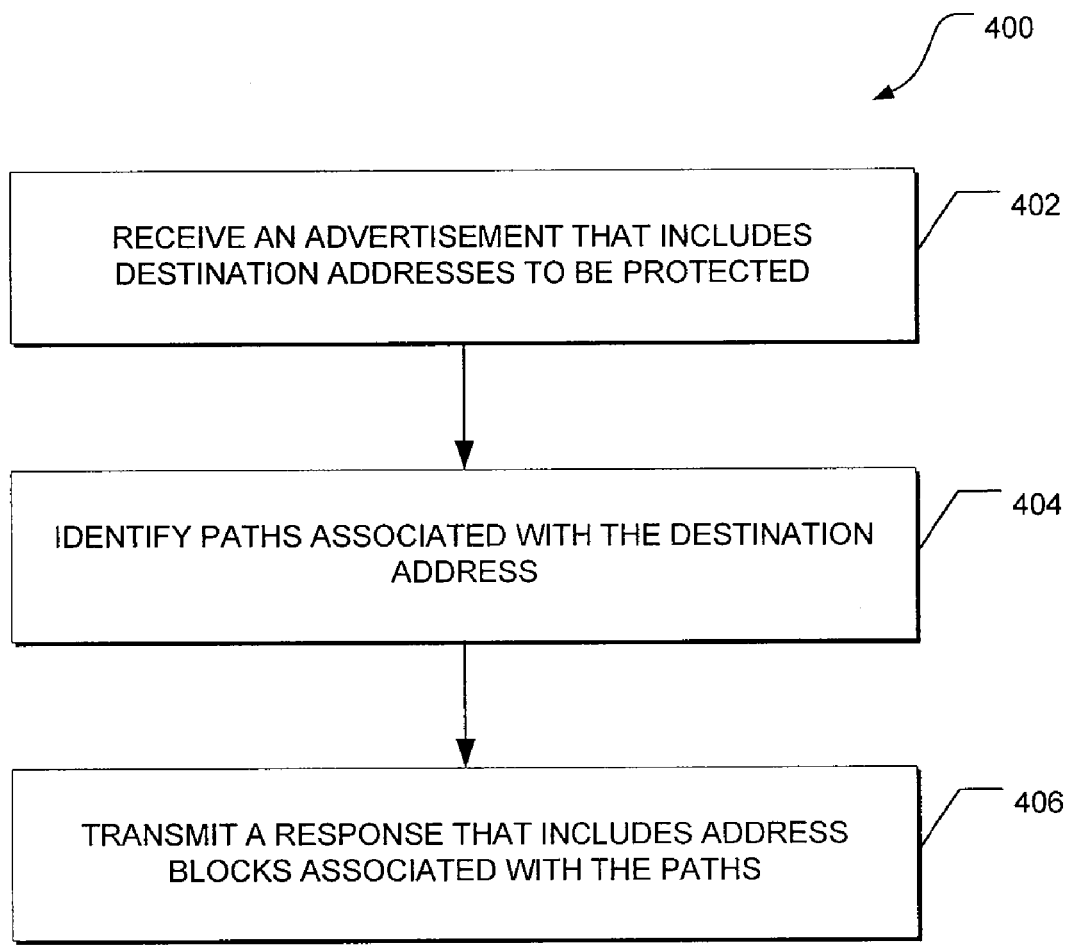
FIG. 4 is a flow diagram of a general overview of a method, in accordance with an example embodiment, for responding to an advertisement from a routing device.

FIG. 4 is a flow diagram of a general overview of a method, in accordance with an example embodiment, for responding to an advertisement from a routing device. In an example embodiment, method 400 may be implemented by path computation and MPLS reroute module 204 of FIG. 2, employed in an apparatus, such as area border routing device ABR102 of FIG. 1. As shown in FIG. 4, the area border routing device receives an advertisement from a routing device at 402. As discussed above, this advertisement includes one or more destination addresses to be protected.

The area border routing device then identifies one or more paths at 404 used by the area border routing device that are destined to the destination address. For example, the area border routing device may receive two destination addresses. The area border routing device then identifies that it uses one path to one destination address and another path to the other destination address. Each path is associated with an address block and, at 406, the area border routing device transmits the address blocks in the form of a response to the routing device that originated the advertisement. For example, the area border routing device may transmit a response to the advertisement, where the response includes the address blocks that are associated with the paths used by the area border routing device to reach the destination addresses.

Figure 5A:
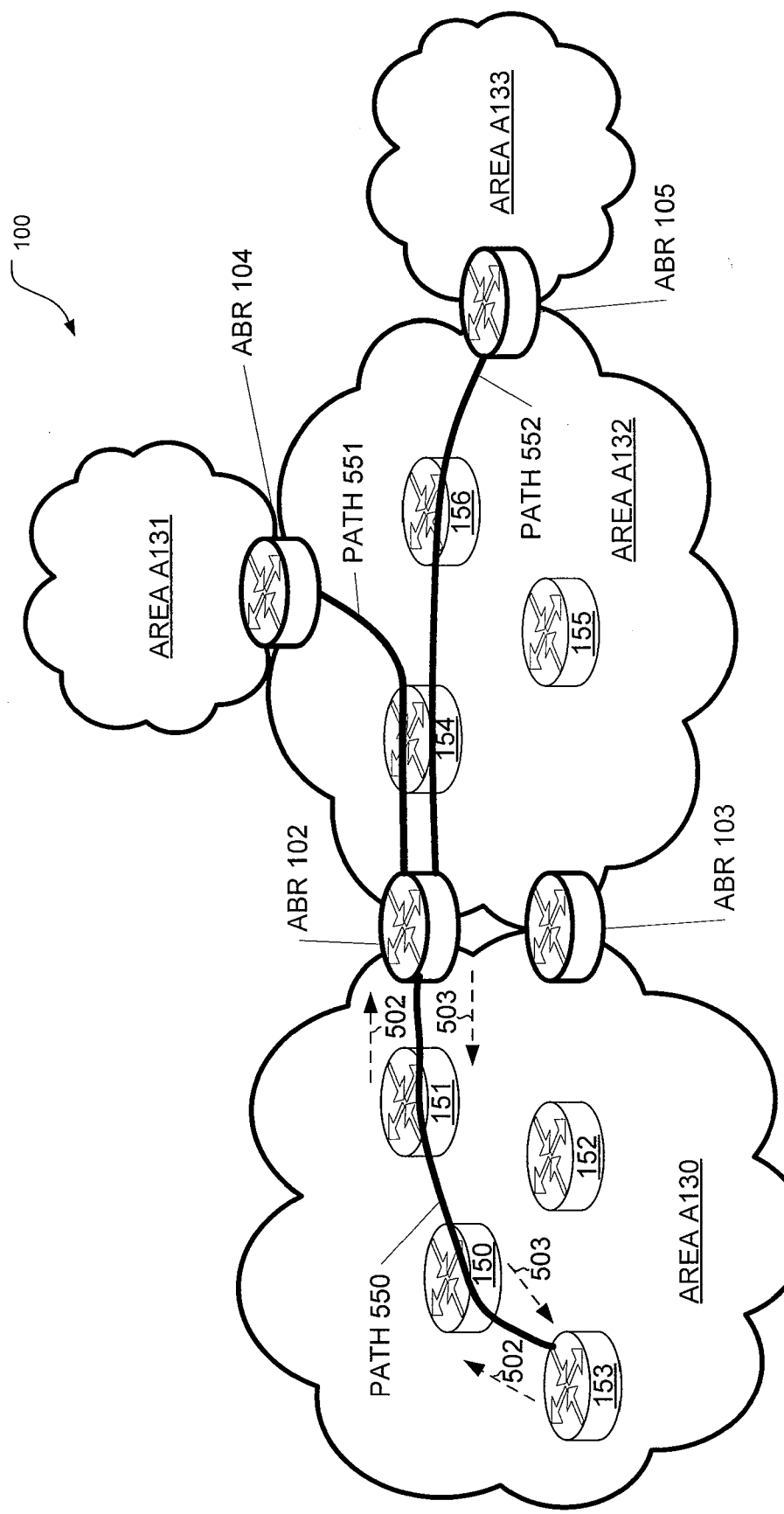
FIGS. 5a and 5b are simplified diagrams illustrating the establishment of paths to area border routing device ABR102, in accordance with an example embodiment.
Figure 5B:
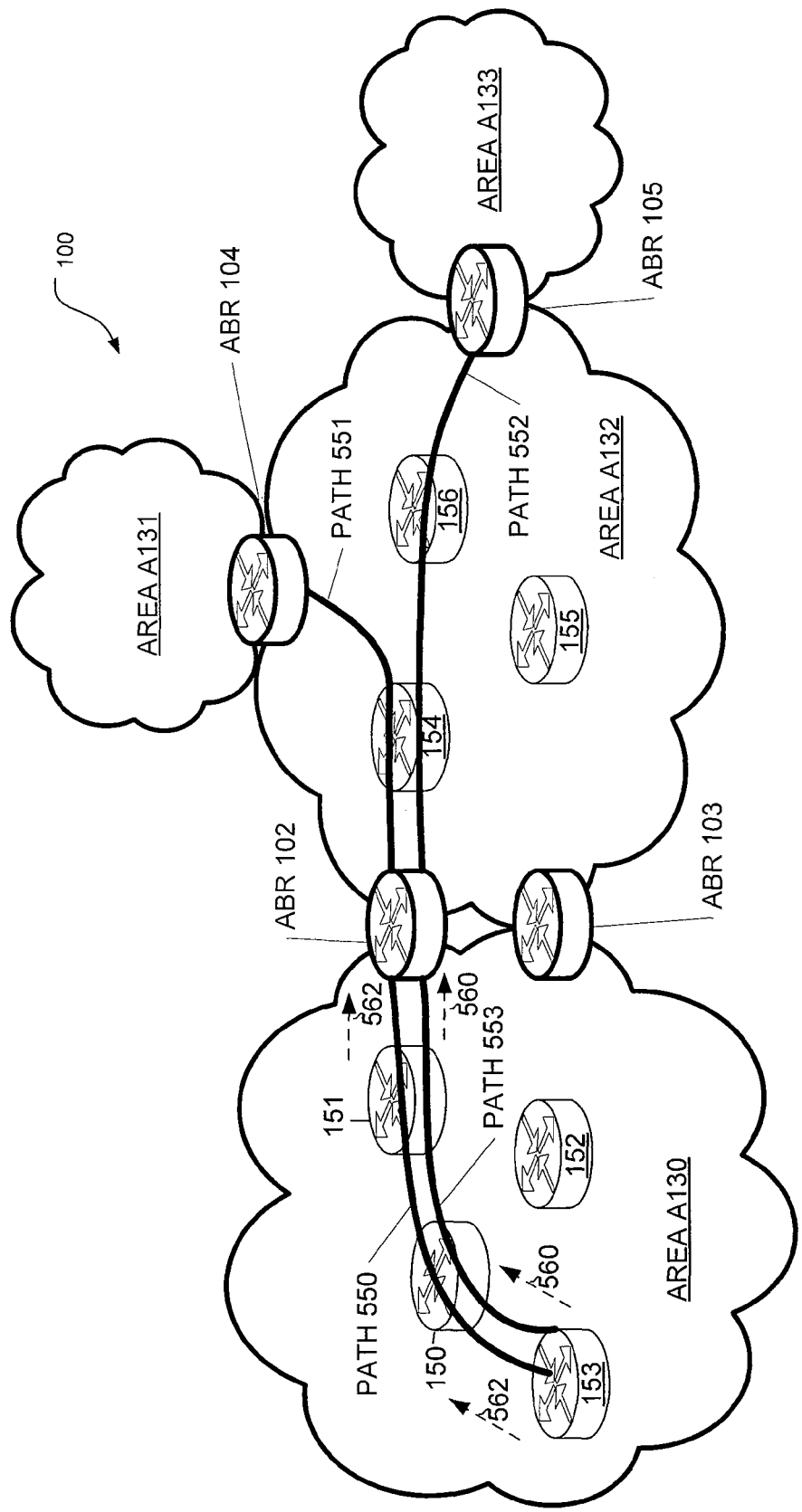

FIGS. 5a and 5b are simplified diagrams illustrating the establishment of paths to area border routing device ABR102, in accordance with an example embodiment. As shown in FIG. 5a, computer network 100 includes various interconnected routing devices ABR102-ABR105 and 150-156 associated with various areas A130-A133. Initially, routing device 153 within area A130 transmits advertisement 502 to area border routing device ABR102 along path 550. In this example, the advertisement includes one block of IP addresses to be protected in case of failure of area border routing device ABR102.

The area border routing device ABR102 receives the advertisement from routing device 153 and the area border routing device then identifies two downstream paths 551 and 552 within area A132 used by the area border routing device that are destined to the IP addresses. It should be noted that "downstream" refers to a direction of a flow of data received by a routing device. For example, from viewpoint of area border routing device ABR102, downstream refers to a direction of flow of data from the area border routing device to routing device 154. On the other hand, "upstream" refers to a direction opposite to that of a downstream direction. For example, from viewpoint of area border routing device ABR102, upstream refers to a direction of a flow of data from the area border routing device ABR102 to routing device 153. Each downstream path 551 or 552 is associated with an address block and area border routing device ABR102 transmits the two address blocks in the form of response 503 to routing device 153.

With reference now to FIG. 5b, routing device 153 then receives response (not shown) from area border routing device ABR102. This response includes two address blocks. One address block is associated with path 551 and the other address block is associated with path 552. In an example embodiment, the response may also include the labels associated with routing device 154 (for example, labels used to send traffic between ABR102 and router 154 along path 551), which is explained in more detail below. Routing device 153 then establishes a path to area border routing device ABR102 for each address block received. To establish the first path, routing device 153 may assign existing path 550 already destined to area border routing device ABR102. Alternatively, routing device 154 may assign a new path. To establish the second path, routing device 153 establishes a new path 553 to area border routing device ABR102. As a result, the two paths 550 and 553 are established between routing device 153 and area border routing device ABR102 within area A130.

In an example embodiment, routing device 153 may transmit additional advertisements 560 and 562 to area border routing device ABR102 that includes an association of paths 550 and 553 with each of the address blocks. As shown in FIG. 5b, routing device 153 may advertise 562 the association of path 550 with an address block, such as the address block associated with path 551. Additionally, routing device 153 may also advertise 560 the association of path 553 with another address block, such as the address block associated with path 552.

Figure 6:
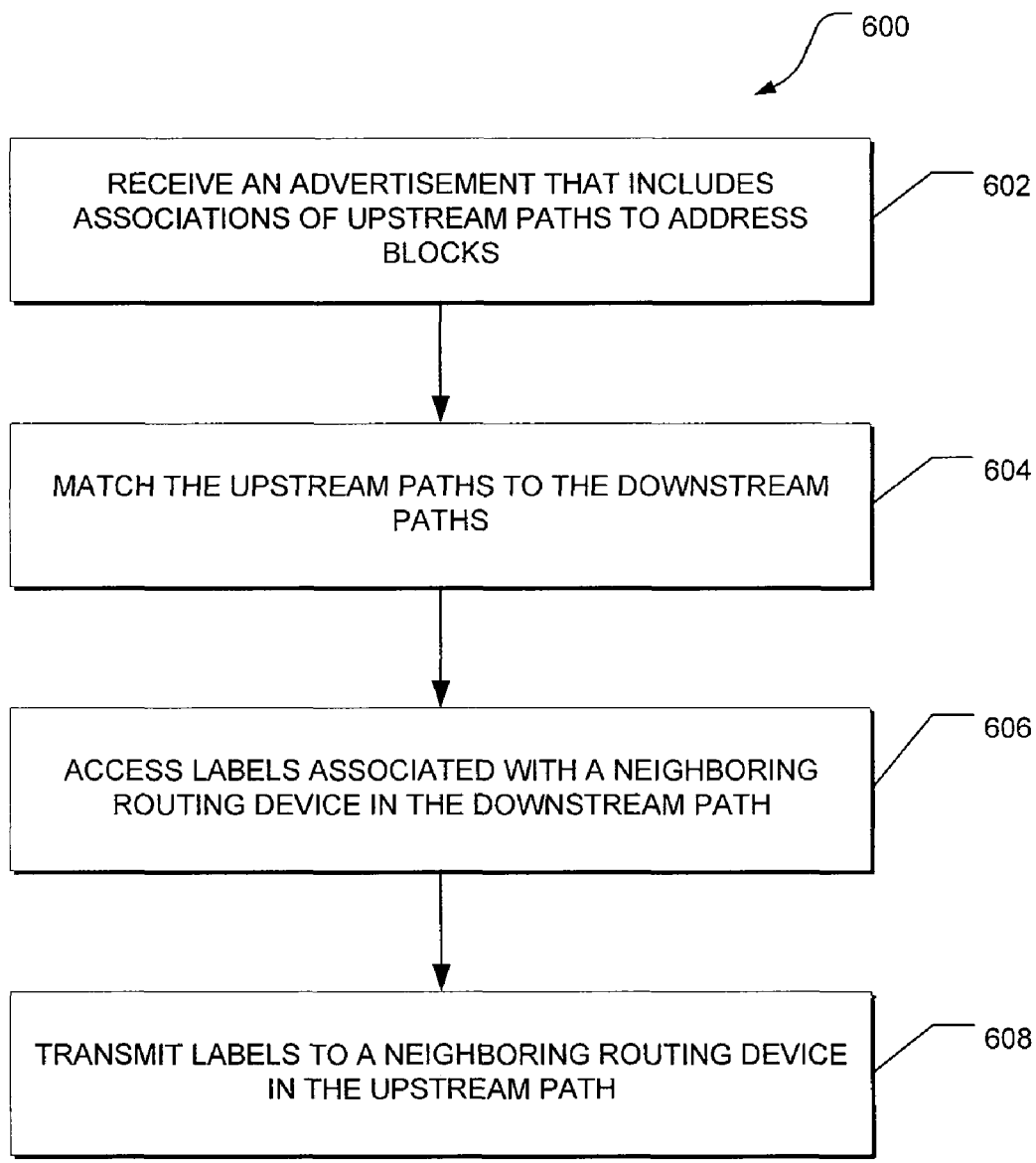
FIG. 6 is a flow diagram of a general overview of a method, in accordance with an example embodiment, for providing information about a neighboring routing device used in a downstream path for use in a reroute.

FIG. 6 is a flow diagram of a general overview of a method, in accordance with an example embodiment, for providing information about a neighboring routing device used in a downstream path for use in a reroute. In an example embodiment, method 600 may be implemented by path computation and MPLS reroute module 204 of FIG. 2, employed in an apparatus, such as area border routing device ABR102 of FIG. 1. As shown in FIG. 6, the area border routing device receives the advertisement at 602 transmitted by a routing device. As discussed above, the advertisement includes associations of paths (or upstream paths from view of the area border routing device) with address blocks, which are established by the routing device. With the receipt of the associations, the area border routing device matches the received upstream paths with the downstream paths at 604 based on the address blocks. For example, the upstream paths and the downstream paths have associated address blocks. The area border routing device matches the associated address blocks, thereby also matching the corresponding paths.

The area border routing device at 606 may also access labels associated with a neighboring routing device in the downstream path. As explained in more detail below, this neighboring routing device is used for the reroute in the event the area border routing device fails. In an example embodiment, the routing device is an immediate neighbor. For example, this routing device may be the closest downstream neighbor to the area border routing device. The area border routing device then transmits the labels to a neighboring routing device in the upstream path at 608. This routing device in the upstream path also is used for the reroute in the event that the area border routing device fails. In an example embodiment, this routing device is also an immediate neighbor. For example, this routing device may be the closest upstream neighbor to the area border routing device.

Figure 7:
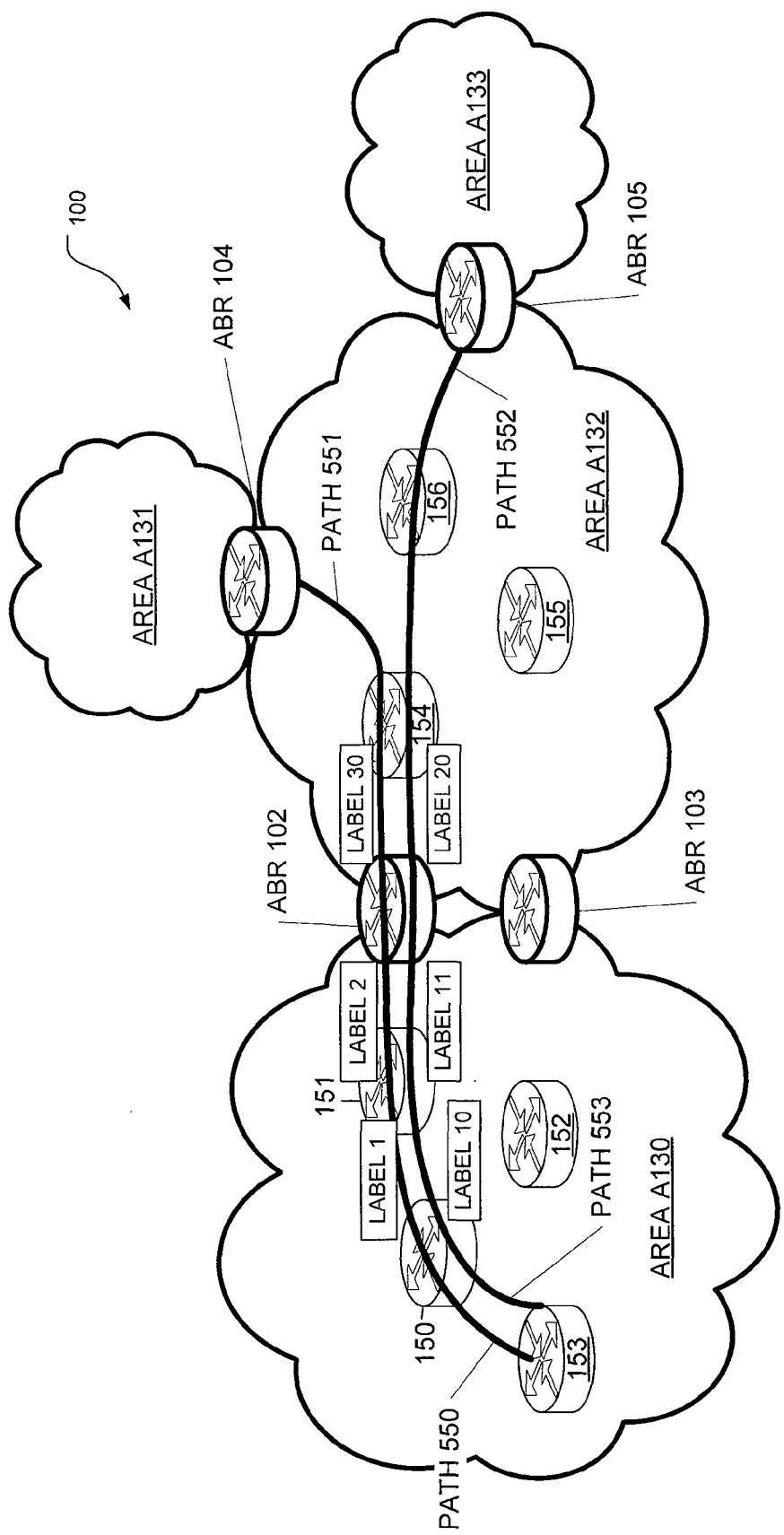
FIG. 7 is a simplified diagram illustrating the transmittal of information about a neighboring routing device used in a downstream path for use in a reroute, in accordance with an example embodiment.

FIG. 7 is a simplified diagram illustrating the transmittal of information about a neighboring routing device used in a downstream path for use in a reroute, in accordance with an example embodiment. Computer network 100 includes various interconnected routing devices ABR102-ABR105 and 150-156 associated with various areas A130-A133. Also illustrated are labels 1, 2, 10, 11, 20 and 30. Label 1 is associated with routing devices 150 and 151 along path 550. Label 2 is associated with routing device 151 and area border routing device ABR102 along path 550. Label 30 is associated with routing device 154 and area border routing device ABR102 along path 551. Label 10 is associated with routing devices 150 and 151 along path 553. Label 11 is associated with area border routing device ABR102 and routing device 151 along path 553. Lastly, label 20 is associated with routing device 154 and area border routing device ABR 102 along path 552.

Area border routing device ABR102 receives an advertisement from routing device 153 that includes associations of upstream paths 550 and 553 with address blocks. With the receipt of the associations, area border routing device ABR102 matches the received upstream paths 550 and 553 with downstream paths 551 and 552 based on the address blocks. In general, area border routing device ABR102 matches the associated address blocks, thereby also matching path 550 with path 551 and also path 553 with path 552. In an example, upon receiving the address blocks, area border routing device 102 access its routing information base (RIB) and then determines the match between upstream paths 550 and 553 and downstream paths 551 and 552.

The area border routing device ABR102 may also access labels 20 and 30 associated with a neighboring routing device in the downstream path, such as routing device 154. Here, routing device 154 is an immediate neighbor to area border routing device ABR102. The area border routing device ABR102 then transmits labels 20 and 30 to a neighboring routing device in the upstream path, such as routing device 151. Here, routing device 151 is an immediate neighbor to area border routing device ABR102. In an example embodiment, labels 30 and 20 are transmitted to routing device 151 by way of their associated paths 550 and 553, respectively. For example, area border routing device ABR102 transmits label 30 to routing device 151 by way of path 550. Similarly, label 20 is transmitted to routing device 151 by way of path 553. As such, routing device 151 may identify the association of labels 30 and 20 through their corresponding paths 550 and 553.

It should be appreciated that, in an example embodiment, area border routing device ABR102 may transmit refresh messages to the downstream neighboring routing device, such as routing device 154, before a failure of the area border routing device. In general, the refresh message is a request to an immediate downstream neighbor, such as routing device 154, to bind upstream paths 550 and 553 to downstream paths 551 and 552. In an example embodiment, the refresh message is a path message, such as an RSVP path message. For example, area border routing device ABR102 uses its matching table to send a copy of path message associated with path 550, which is received from routing device 151, to routing device 154 within another path message associated with path 551. The binding may be included within an LSP-ATTRIBUTE of the RSVP path message. As explained in more detail below, if area border routing device ABR102 fails, then routing device 151 sends its path message to routing device 154 by way of an alternate path or bypass path (not shown).

Figure 8:
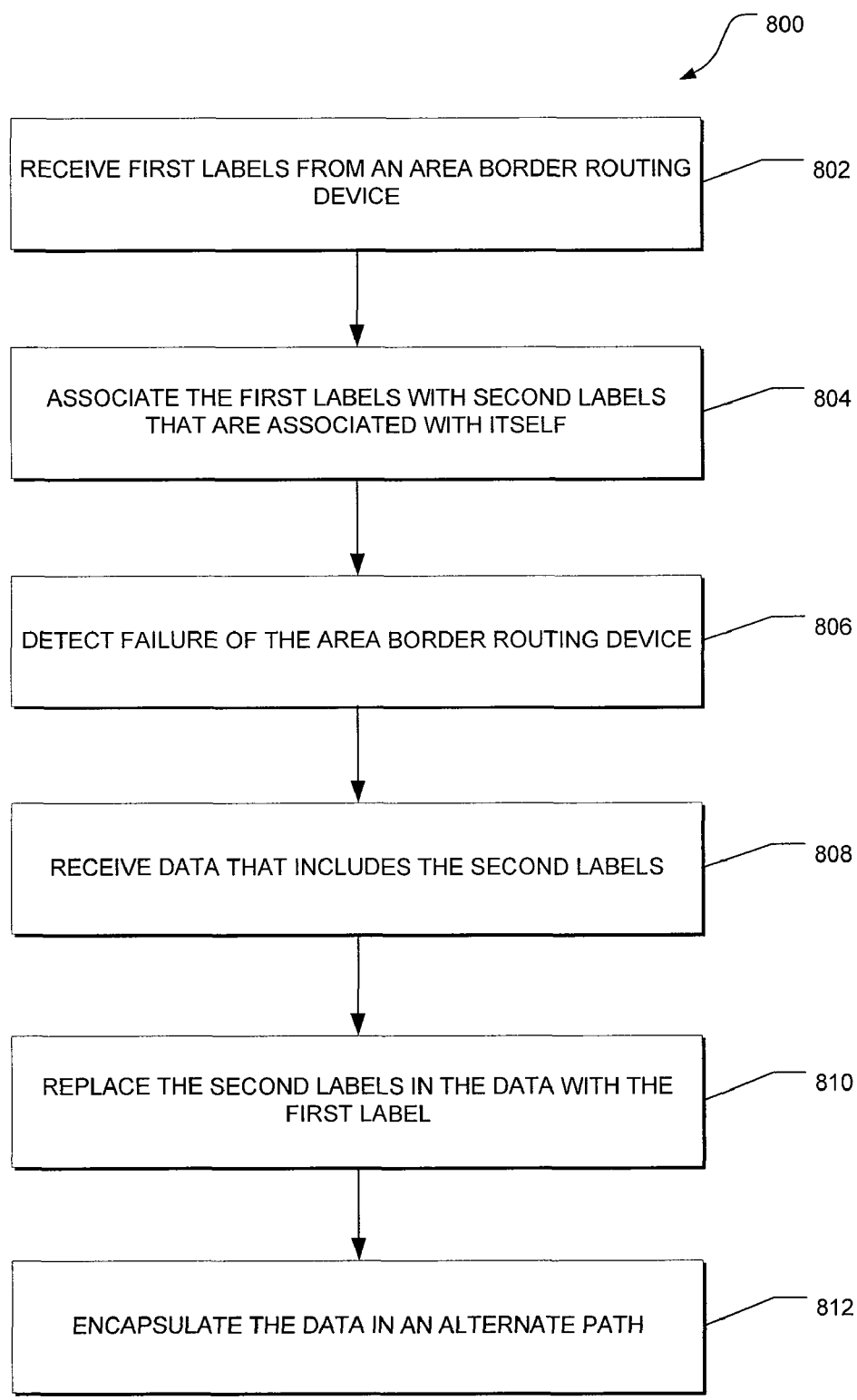
FIG. 8 is a flow diagram of a general overview of a method, in accordance with an example embodiment, for rerouting traffic upon a failure of an area border routing device.

FIG. 8 is a flow diagram of a general overview of a method, in accordance with an example embodiment, for rerouting traffic upon a failure of an area border routing device. In an example embodiment, method 800 may be implemented by path computation and MPLS reroute module 204 of FIG. 2, employed in an apparatus, such as routing device 151 of FIG. 1. As shown in FIG. 8, a routing device receives first labels from an area border routing device at 802. These first labels are associated with a routing device that is an immediate downstream neighbor of the area border routing device. At 804, the routing device then associates the first labels with second labels associated with itself.

When a failure of the area border routing device is detected at 806, the data received by the routing device is rerouted to an alternate path that bypasses the area border routing device. For example, at 808, the routing device receives data from a neighboring upstream routing device that includes the second labels. The routing device then replaces or swaps the second labels with the first labels in the data at 810. As illustrated in detail below, the routing device thereafter encapsulates the data at 812 in an alternate path that is destined to another routing device that is an immediate downstream neighbor of the area border routing device.

Figure 9:
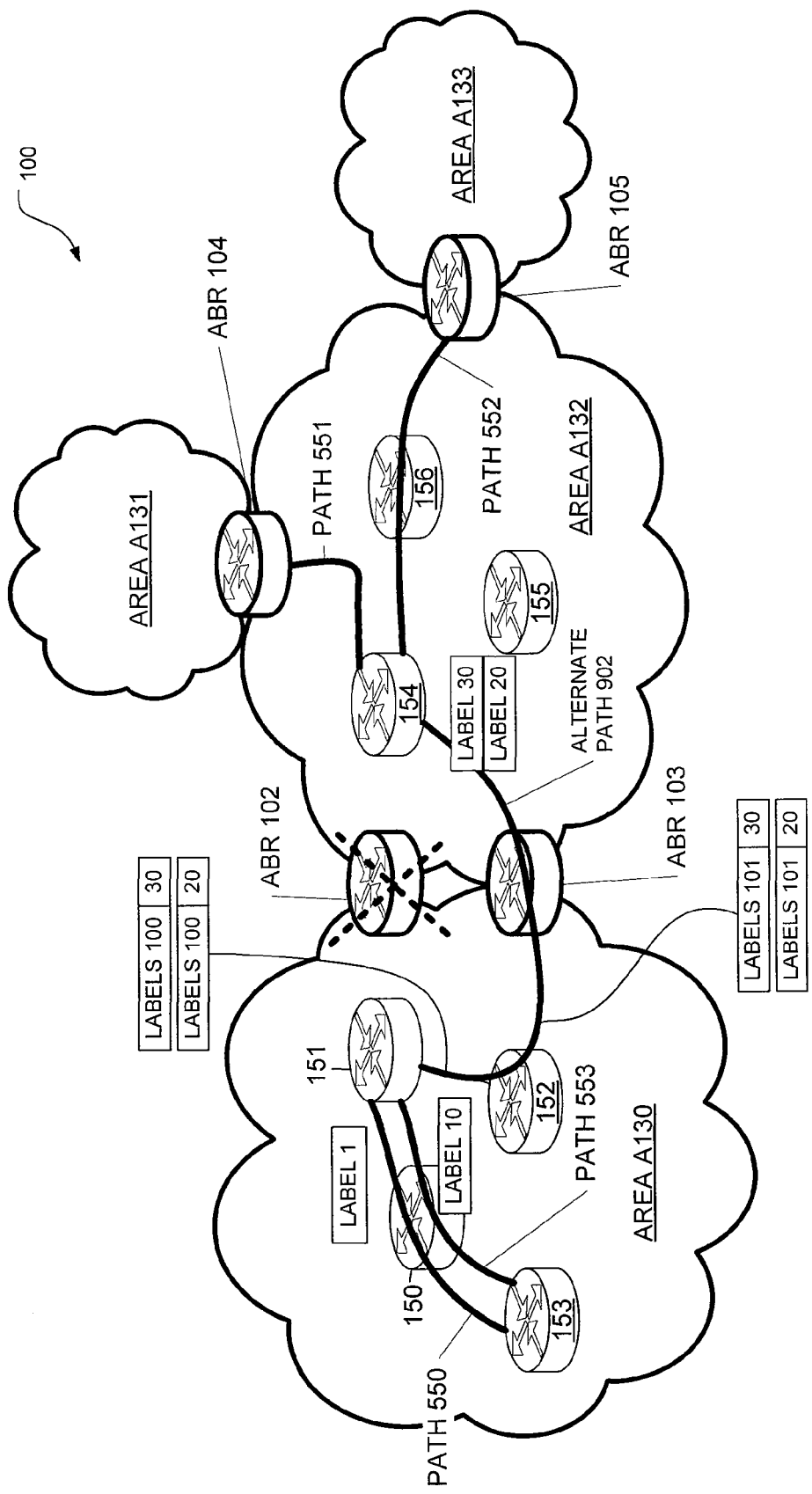
FIG. 9 is a simplified diagram, in accordance with an example embodiment, illustrating the rerouting of traffic upon a failure of an area border routing device.

FIG. 9 is a simplified diagram, in accordance with an example embodiment, illustrating the rerouting of traffic upon a failure of an area border routing device. Computer network 100 includes various interconnected routing devices ABR102-ABR105 and 150-156 associated with various areas A130-A133. Also illustrated are labels 1, 10, 100, 101, 30, and 20. Label 1 is associated with routing device 151 and path 550. Label 10 is associated with routing device 151 and path 553. Label 30 is associated with routing device 154 and path 551. Label 20 is associated with routing device 154 and path 552. Label 100 is associated with routing device 152 and alternate path 902. Lastly, label 101 is associated with area border routing device ABR103 and alternate path 902.

Before a failure of area border routing device ABR102, routing device 151 receives labels 30 and 20 from the area border routing device. These labels 30 and 20 are associated with routing device 154 that is an immediate downstream neighbor of area border routing device ABR102. The routing device 151 then associates the labels 30 and 20 with labels 1 and 10 associated with itself.

When a failure of area border routing device ABR 102 is detected, the data received by routing device 151 is rerouted to alternate path 902 that bypasses the area border routing device. As shown in FIG. 9, routing device 151 receives data from a neighboring upstream routing device 150 that includes labels 1 and 10. Returning to FIG. 7, if area border routing device ABR 102 is functioning, then routing device 151 swaps labels 1 and 10 included in received data with labels 2 and 11, respectively. However, as shown in FIG. 9, if a failure of area border routing device ABR 102 is detected, then routing device 151 cannot swap labels 1 and 10 with labels associated with the area border routing device because the area border routing device cannot forward the data to area A132. Instead, routing device 151 replaces or swaps labels 1 and 10 with labels 30 and 20, respectively, in the data. Routing device 151 thereafter encapsulates the data in alternate path 902 that bypasses area border routing device ABR 102. This alternate path 902 is destined to routing device 154, which is an immediate downstream neighbor of area border routing device ABR 102, because the labels 30 and 20 that were previously passed to routing device 151 are associated with routing device 154. As illustrated in FIG. 9, in an example, the data may be encapsulated by attaching labels 100 and 101 associated with alternate path 902 to labels 30 and 20.

Figure 10:
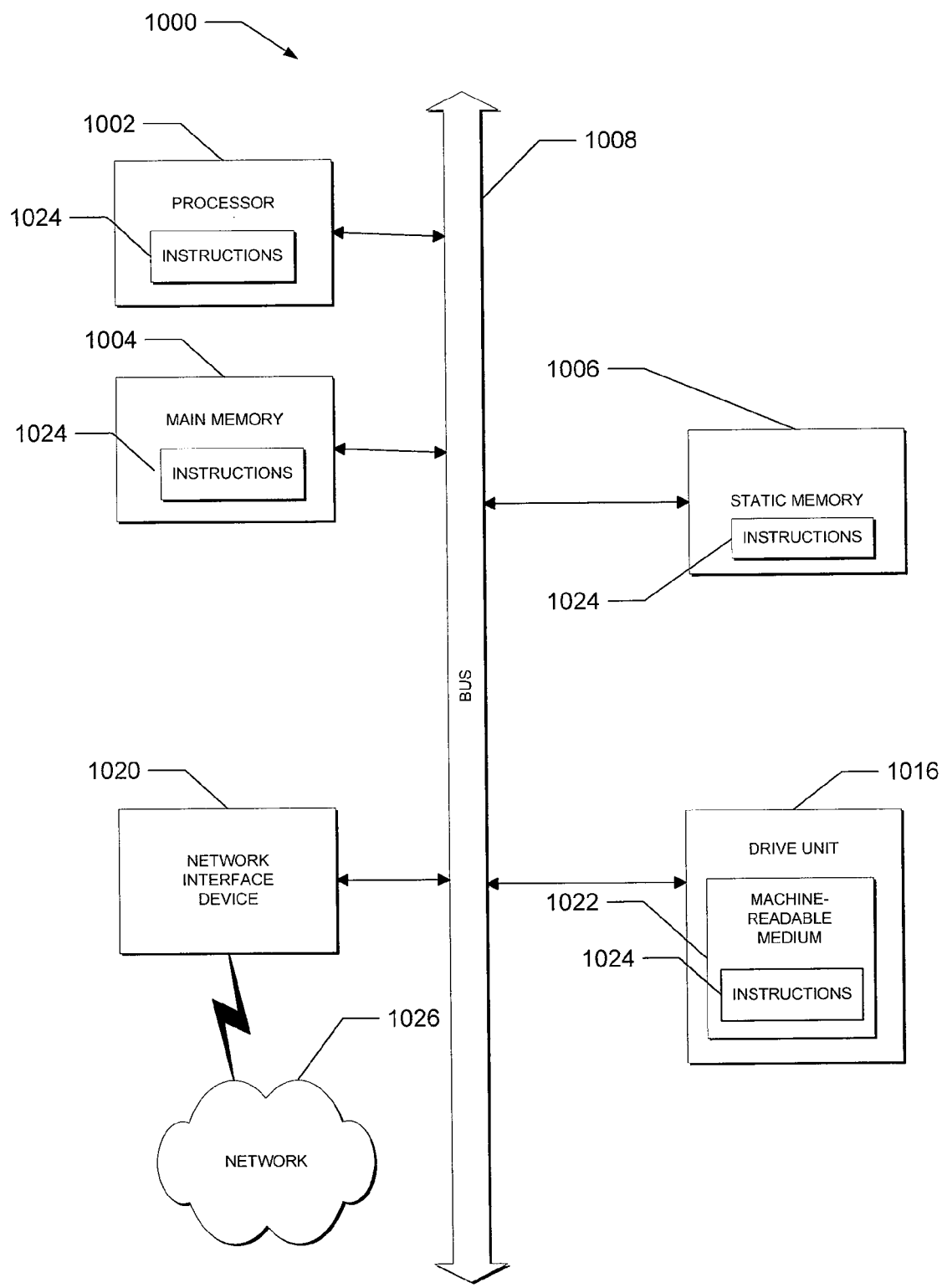
FIG. 10 is a simplified block diagram of a machine in the example form of a computing system within which a set of instructions, for causing the machine to perform any one or more of the methodologies discussed herein, may be executed.

FIG. 10 is a simplified block diagram of a machine in the example form of a computing system within which a set of instructions, for causing the machine to perform any one or more of the methodologies discussed herein, may be executed. In alternative embodiments, the machine may be connected (e.g., networked) to other machines. The machine may be a network router (e.g., label switch router), switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing system 1000 includes processor 1002 (e.g., a central processing unit (CPU)), main memory 1004 and static memory 1006, which communicate with each other via bus 1008. Computing system 1000 may also include disk drive unit 1016 and network interface device 1020.

Disk drive unit 1016 includes machine-readable medium 1022 on which is stored one or more sets of instructions and data structures (e.g., software 1024) embodying or utilized by any one or more of the methodologies or functions described herein. Software 1024 may also reside, completely or at least partially, within main memory 1004 and/or within processor 1002 during execution thereof by computing system 1000, with main memory 1004 and processor 1002 also constituting machine-readable, tangible media. Software 1024 may further be transmitted or received over network 1026 via network interface device 1020 utilizing any one of a number of well-known transfer protocols (e.g., Hypertext Transfer Protocol (HTTP)).

While machine-readable medium 1022 is shown in an example embodiment to be a single medium, the term "machine-readable medium" should be taken to include a single medium or multiple media (e.g., a centralized or distributed database, and/or associated caches) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A method comprising:
   transmitting an advertisement that includes a destination address to be protected by an area border routing device;
   receiving a response to the advertisement, the response including a plurality of address blocks associated with a plurality of paths, the plurality of paths being used by the area border routing device to route to the destination address; and
   establishing a path to the area border routing device for each of the plurality of address blocks,
   wherein the response further includes a label associated with a routing device, the routing device being an immediate downstream neighbor of the area border routing device.

2. The method of claim 1, wherein the establishing of the path comprises establishing a plurality of additional paths to the area border routing device, each additional path of the plurality of additional paths corresponding to one address block of the plurality of address blocks.

3. The method of claim 1, wherein the establishing of the path comprises assigning an existing path destined to the area border routing device.

4. The method of claim 1, wherein the establishing of the path comprises establishing a new path to the area border routing device.

5. The method of claim 1, further comprising transmitting an additional advertisement that includes an association of the path with each of the plurality of address blocks.

6. The method of claim 1, further comprising associating the path with the destination address to be protected by the area border routing device.

7. The method of claim 1, wherein the response is transmitted by the area border routing device.

8. The method of claim 1, wherein each address block of the plurality of address blocks is associated with one path of the plurality of paths.

9. A method comprising:
   at an area border routing device,
   receiving an advertisement that includes an association of an upstream path with an address block;
   matching the upstream path to a downstream path based on the address block;

accessing a label associated with a first neighboring routing device in the downstream path, the first neighboring routing device being an immediate downstream neighbor;

transmitting the label to a second neighboring routing device in the upstream path, the second neighboring routing device being an immediate upstream neighbor; and transmitting a request to bind the upstream path with the downstream path, the request being transmitted to the first neighboring routing device, wherein the request is transmitted to the first neighboring routing device before a failure of the area border routing device.

10. The method of claim 9, where the label is transmitted to the second neighboring routing device by way of the upstream path.

11. The method of claim 9, wherein the request is a Resource Reservation Protocol path message.

12. A method comprising:

receiving a first label from an area border routing device along a path, the first label being associated with a first routing device, the first routing device being an immediate downstream neighbor of the area border routing device;

associating the first label with a second label, the second label being associated with a second routing device;

receiving data that includes the second label;

detecting a failure of the area border routing device;

replacing the second label in the data with the first label upon the failure of the area border routing device; and encapsulating the data in an alternate path to the first routing device.

13. The method of claim 12, wherein the encapsulating of the data comprises attaching a third label associated with the alternate path to the data.

14. An apparatus comprising:

at least one processor; and a machine-readable medium in communication with the at least one processor, the machine-readable medium being configured to store a path computation and Multiprotocol Label Switching (MPLS) reroute module, the path computation and MPLS reroute module being executed by the at least one processor cause the operations to be performed, comprising:

receiving a first label from an area border routing device along a path, the first label being associated with a first routing device, the first routing device being an immediate downstream neighbor of the area border routing device;

associating the first label with a second label, the second label being associated with the apparatus;

receiving data that includes the second label;

detecting a failure of the area border routing device;

replacing the second label in the data with the first label upon a failure of the area border routing device; and encapsulating the data in an alternate path to the first routing device.

* * * * *